ENCAPSULATED MICROELECTRONIC DEVICES

Filed May 15, 1967 3 Sheets-Sheet 1

JOHN F. HINCHEY
INVENTOR.

BY
Karl W. Sommermeyer
ATTORNEY

United States Patent Office 3,489,952
Patented Jan. 13, 1970

3,489,952

ENCAPSULATED MICROELECTRONIC DEVICES

John F. Hinchey, Contra Costa County, Calif., assignor to The Singer Company, a corporation of New Jersey Filed May 15, 1967, Ser. No. 638,536
Int. Cl. H02b *1/00, 1/04*
U.S. Cl. 317—100 8 Claims

ABSTRACT OF THE DISCLOSURE

Microelectronic units such as integrated-circuit chips equipped with heat-conducting extensions, and also terminal pins, are sealed and bonded, face down, on a transparent mold board, precisely located with respect to gauge marks on the upper surface by observation from below, and embedded flush, or coplanar, with the surface of a cast encapsulating block such as ceramic or epoxy. Insulated interconnecting conductors are formed on the coplanar surface of said block and embedded microelectronic units.

BACKGROUND

This invention relates to microelectronics and to systems consisting of assemblies of microelectronic units, such as so-called "chips," or "bars," carrying integrated circuits.

A microelectronic unit may be a small object constituting (1) a component such as a transistor or diode, (2) a circuit such as an amplifier, flip-flop or gate, or (3) a plurality of such components or circuits. Such units are formed on either semiconductor or insulating bases by the controlled addition and removal of materials, for example, by known diffusion, epitaxial, metal-oxide-silicon, and thin film techniques.

It is known to form many such microelectronic units simultaneously on a wafer, for example, about one inch in diameter, and then to cut the wafer into about 100 chips, dice, or bars, each of which then constitutes such a unit.

It has been proposed to form all of the components, or elements, required for a system of circuits, for example, a computer memory, on a single wafer and then to interconnect those elements with thin metal films or wire connectors. However, typically 60% of the elements so produced on a wafer will be unusable. So it has been further proposed that the wafer be designed with excessive elements, and that the good elements, if there are enough of each needed kind, be interconnected for the system. But such a procedure would require that the interconnecting pattern be designed after the locations of the good elements had been determined, and in general a special design would be required for each wafer. And so it has been further proposed that such design be performed by a computer. But even then special masks would need to be made for each wafer, for connecting the elements by thin film techniques. Alternatively, it has been proposed that the connections be made by the manual placement and bonding of individual wires.

It has been suggested that the dice, or chips, be cut from the wafer and that those constituting usable elements be fastened to a suitable support, as by gluing them to a ceramic plate, and that the separate elements be interconnected with wires. But such wire connections are more expensive and less reliable than the film techniques.

SUMMARY

It is an object of the invention to provide a method of encapsulating microelectronic units, such as circuit chips, by laying them face down in a mold and casting encapsulant over them to embed them coplanar with the surface of the cast block, and by laying conductors on said surface. Further objects include precisely locating such units visually on a transparent mold board, the locating of such units with respect to gauge points on the upper surface of a mold board, the observation of such operations from below, and the securing and sealing of such units thereon by a tacky or hardenable film.

It is an object of the invention to provide an apparatus utilizing a transparent mold plate for positioning and holding microelectronic units on one face thereof, and for observing such operation through said transparent plate, as, for example, from below a level plate. Other objects include the provision of gauge points, such as etched areas or patterns of lines, for gauging the position of such units on a mold plate, and the provision of such gauge points on the face on which such units are placed.

It is an object of the invention to provide a microelectronic system in a block of cast encapsulant, such as ceramic or epoxy, wherein microelectronic units are embedded flush in the cast block to provide a smooth continuous surface with the block, such as a coplanar surface, for permitting the formation of interconnecting conductors on said surface. Further objects include the provision of improved heat sinks, such as metal extensions, for said units, the provision of flush terminals in said block for the system, the provision of an encapsulant having a coefficient of expansion close to that of the units, and the provision of a firm bond.

These and other objects and advantages of the present invention will be apparent from the following description of specific embodiments thereof, taken in connection with the accompanying drawings.

DRAWINGS AND DESCRIPTION

Figure 1:
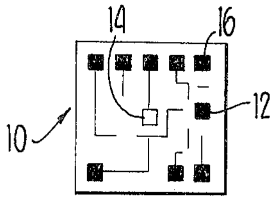
FIGS. 1 and 2 are orthographic views of an integrated circuit chip, or microelectronic unit.

In the drawings, some dimensions are exaggerated, and some circuit configurations have been simplified for facilitating the description.

Figure 2:
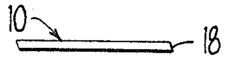

FIGS. 1 and 2 show, much enlarged, an integrated-circuit chip, bar, or die 10, which constitutes a microelectronic unit. Such a chip is approximately one-tenth of an inch square and one-hundredth of an inch thick. The chip includes a substrate 12 of the semiconductor silicon having one or more operative components 14, such as transistors, diodes and resistors, formed in one surface, and thin-film, metal connections overlying these operative elements for connecting them to each other and to metal interconnection pads 16 along one or more edges. The electric circuit on this chip may be, for example, a flip-flop. Typically, one hundred such microcircuit units are formed simultaneously on a single silicon wafer, or slice (cut from a silicon crystal), which wafer is then scribed and broken to make the individual chips, or dice. The broken edge 18 of the die follows a natural cleavage plane of the crystal from which the wafer was cut which plane lies at an angle of about three degrees, shown exaggerated, from the perpendicular to the die. This angle of cut for the wafer is chosen for the desirable characteristics affecting epitaxial deposition and etching that it gives to the wafer.

Such microelectronic units may be formed in silicon substrates by other processes, and may also be formed on other semiconductors, such as germanium, or on inert substrates, such as ceramics and glass by various processes. Microelectronic units of all these types may be encapsulated to form microelectronic systems by the structures and processes of the present invention.

Figure 3:
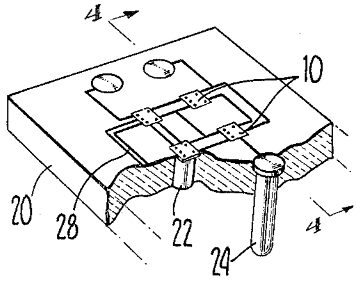
FIG. 3 is a pictorial view of an encapsulated microelectronic system, including a plurality of units such as chips like that of FIG. 1.
Figure 4:
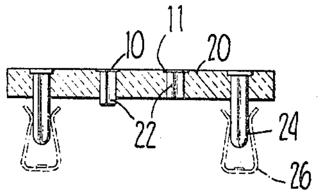
FIG. 4 is a section taken along the lines 4—4 of FIG. 3.

FIGS. 3 and 4 are partly-diagrammatic views showing chips, or dice, which constitute microelectronic units encapsulated to form a micro system according to my present invention. There, chips 10 constituting microelectronic units similar to the chip of FIG. 1 are supported in a ceramic or epoxy encapsultant constituting a block 20. Conveniently, each chip 10 is bonded to a pin 22, FIGS. 3, 4 and 5, of gold-plated Kovar, an alloy of nickel and iron having a coefficient of thermal expansion close to that of silicon. The chip 10 and pin 22 are heated to above 450° C. and placed in contact. A eutectic alloy of gold and silicon forms and bonds them. Since the circuits of a single chip, having a surface of .01 square inch or less, may be expected to dissipate as much as one watt, it is desirable to provide good heat conductivity for carrying the heat away. The pin 22 distributes the heat to the block 20, and may also directly engage an external heat conductor or heat sink. It also serves as a handle for the chip during assembly. Other gold plated Kovar pins 24 are included in the assembly to serve as terminals, and conveniently they extend through the block 20 so that they may serves as mounting pins for engaging jacks 26 as shown in FIG. 4.

The surfaces of the chips 10 and terminals 22 are flush, or coplanar, with the surface of the block 20, and metal conductors 28 are applied to the surface of the block to connect the chips 10 to each other and to the terminal pins 24. The connections to the chips 10 are made to the interconnection pads 16 shown in FIG. 1. The block 20 shown in FIG. 3 may be one inch square, and the conductors 28 may be .003 inch wide with .003 inch spaces between adjacent conductors.

Figure 6:
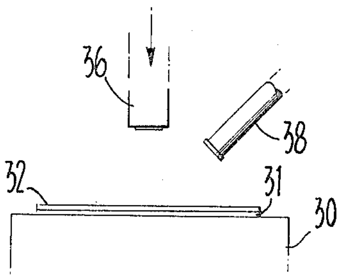
FIG. 6 is an elevational view of part of an assembly machine.
Figure 8:
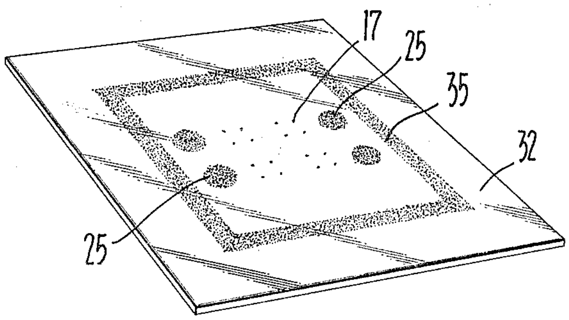
FIG. 8 is a pictorial view of a transparent mold plate, according to the present invention.

The assembly shown in FIGS. 3 and 4 is constructed as follows: FIG. 6 shows parts of a microelectronic-circuit assembly machine. It includes a bench block 30, called a heat column, which can be maintained at a selected temperature. A glass plate 32 such as that shown in FIG. 8 is laid over a mirror 31 which lies atop the column. This plate 32 is etched, or marked, on its upper surface as, for example, as shown in FIG. 8, for indicating the position 35 for a frame 34 that forms the sidewalls of a mold (FIG. 10) for forming the block 20, for showing the positions 25 for the terminal pins 24, and for showing the positions 17 for the square interconnecting pads 16 of the chips 10 such as those of FIG. 1. Above the plate 32 are a chuck 36 for holding chips 10 and a viewing microscope 38. The heat column 30 and the chuck 36 are parts of a known machine which includes controls by which the operator can move and control the chuck to pick up and drop chips, move them laterally, and set them into place on the glass plate 32.

Figure 5:
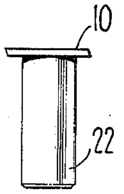
FIG. 5 is an enlarged detail of FIG. 3.
Figure 7:
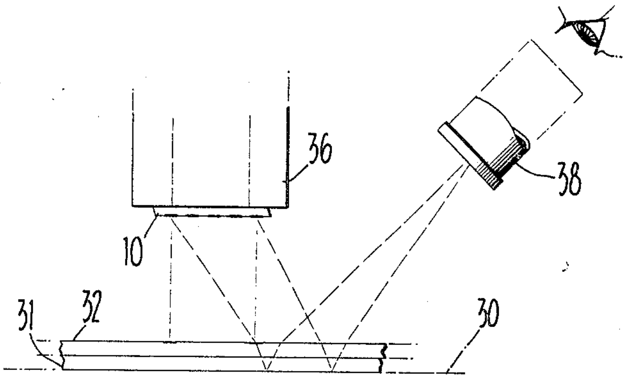
FIG. 7 is an enlarged and partly diagrammatic view of a portion of the machine of FIG. 6.
Figure 9:
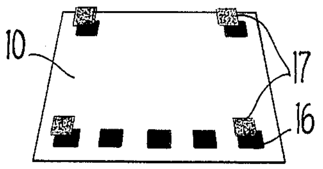
FIG. 9 is part of the view seen by the operator through the microscope of the machine of FIGS. 6 and 7 when carrying out the present invention on said machine.

As indicated in FIG. 7, the operator views the work through the microscope 38 by means of reflections off the mirror 31. Looking through the microscope, the operator can then set the chip 10 down on the glass plate 32 so that the corner pads 16 of the chip 10 rest directly on the corresponding etched, or marked, spots 17 on the glass mold plate. As the operator brings the chip into proper position, she will not only see the corner pads 16 become hidden by the etched spots 17, as shown in FIG. 9, but will be guided further by seeing the other pads 16 become aligned and spaced with the etched spots 17 of the glass. Having thus placed the chip 10 in proper position on the glass 32, she releases it from the chuck 36. This operation of placing a chip 10 on the glass plate 32 is the same whether the chip is or is not provided with the Kovar heat sink and handle 22 as shown in FIG. 5. The chips 10, the terminals 24 and the side frame 34 of the mold are all placed in position on glass 32 in this same manner.

Figure 10:
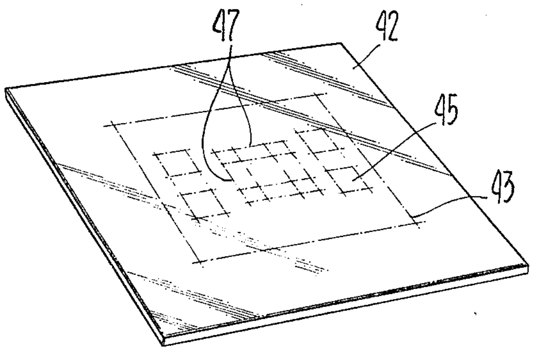
FIG. 10 is a pictorial view, similar to FIG. 8, showing another mold plate according to my present invention.

Alternatively, a glass plate 42, FIG. 10, may be scribed to show the positions of the parts. Thus, scribed lines 43 mark the position for the inner edge of the frame 34, and the small squares 45 formed by the intersections of paired lines outline the positions for the terminals 24. Intersecting lines may similarly outline the positions of the chips 10, but preferably, the points of intersection of lines 47 mark the centers of the corner interconnecting pads 16.

Figure 11:
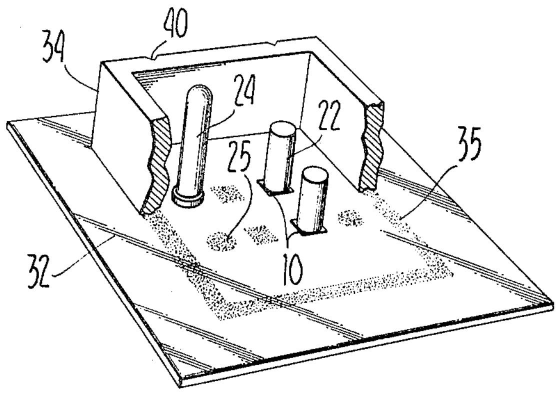
FIG. 11 is a pictorial cutaway view of a mold and inserts assembled according to the invention on the machine of FIGS. 6 and 7.

In order to secure the parts temporarily in place on the glass, and also to prevent creeping of the encapsulant as will be described, the upper surface of the glass plate is coated. One suitable material is a silicone material in a solvent, identified as Ram Mold Release 225, and sold by Ram Chemicals, Inc., Gardena, Calif. This solution can be brushed or wiped on and dried in air at room temperature to a firm but tacky, transparent film. The parts, when set on this film at room temperature, stick to it well enough that the assembly can be handled. Baking at 225° F. for 30 to 60 minutes cures the film and increases the strength of the bond. A part of the mold thus constructed is shown in the cutaway view of FIG. 11. Alternatively, a thin layer of carnauba wax can be applied to the glass plate 32 or 42, from a hot solution of trichloroethylene. With this wax, the heat column 30, FIGS. 6 and 7, is held at 50° C., at which temperature the carnauba wax stays liquid and transparent. After the parts have been placed in position, the assembly is cooled with a gentle flow of nitrogen to solidify the wax so that the resulting mold can be easily handled.

Figure 12:
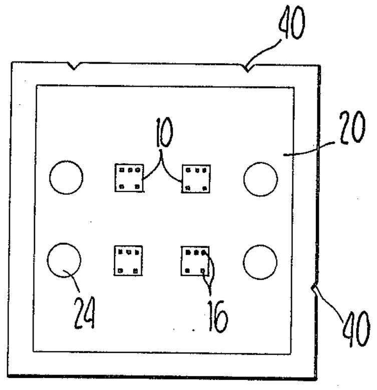
FIG. 12 shows a cast encapsulation with a mold frame thereon.

The encapsulating material is then poured into the mold and permitted to set, and then the glass plate 32 or 42 is removed. Preferably, the encapsulating ceramic or epoxy is further cured and hardened by baking. Preferably, the frame 34 is left on the block 20 (FIG. 12) to facilitate handling and to serve as a gauge or reference during further processing. To this end, the frame may be provided with accurately positioned notches, or gauge points, 40. The circuit connections as shown in FIG. 3 may then be applied.

The material for the encapsulating block 20 should be rigid and stable, should have a coefficient of thermal expansion close to that of the material of the chips. It should wet the parts and be easily flowable so that it can fill all parts of the mold, and so eliminate voids, without exerting sufficient force against the chips and terminals to move them on the glass plate. In particular, the encapsulant must fill the corners, and wet the edges of the chips for a good bond, as at 11 in FIG. 4, but should not stick to the mold.

The encapsulant should produce a cast surface that is essentially smooth and planar to permit the application of thin conductors to the surface. To that end it should be fine grained or grainless and be capable of being controlled for the elimination of bubbles, and it should not creep between the chips 10 and the glass plate 32 or 42, or between the terminals 24 and the glass plate.

Wetting is facilitated by a high surface tension of the encapsulant, but high surface tension could be expected to aggravate the problems of bubbles, creep, and sticking to the mold. However, these latter problems are met by other means. The coating of mold release or carnauba wax on the glass plate 32 or 42 seals the chips 10 and terminals 24 thereto and so helps to prevent the creeping of the encapsulating material, and also helps to release the solidified block 20 from the glass 32 or 42 and from the mold frame 34. With both the ceramic and the epoxy materials the problem of bubbles can be reduced by avoiding violent mixing operations that would whip air into the material. In addition, bubbles may be reduced and eliminated from the ceramic materials by mincing them in an evacuated pug mill as is done in the manufacture of fine China. The removal of such air bubbles may also be facilitated by pouring the minced material into the mold in vacuum.

For a ceramic encapsulating material I have found the following satisfactory: a magnesium carbonate material identified by the trademark "Saueriesen No. 30" sold by the Sauerisen Company, Pittsburgh, Pa., and a silicon dioixde material known as "Eccoceram QC" sold by Emerson and Cuming, Canton, Mass.

Among epoxies I have found the following satisfactory: An epoxy resin, identified as "Microcast 200," and an epoxy resin with mineral filler identified as "Microcast 203," both sold by Electro-Science Laboratories, Inc., Philadelphia, Pa. These epoxies set at room temperature. The glass plate 32 and frame 34 can then be removed or not, as preferred, and the block baked for one hour at 105° C. to harden it. Alternatively, I may use epoxy resins "Tra-Cast 3101" or "Tra-Cast 3103," both sold by Tra-Con, Inc., Medford, Mass. These materials need up to several hours at 25° C. for setting and two to four hours at 75° C. for hardening.

Figure 13:
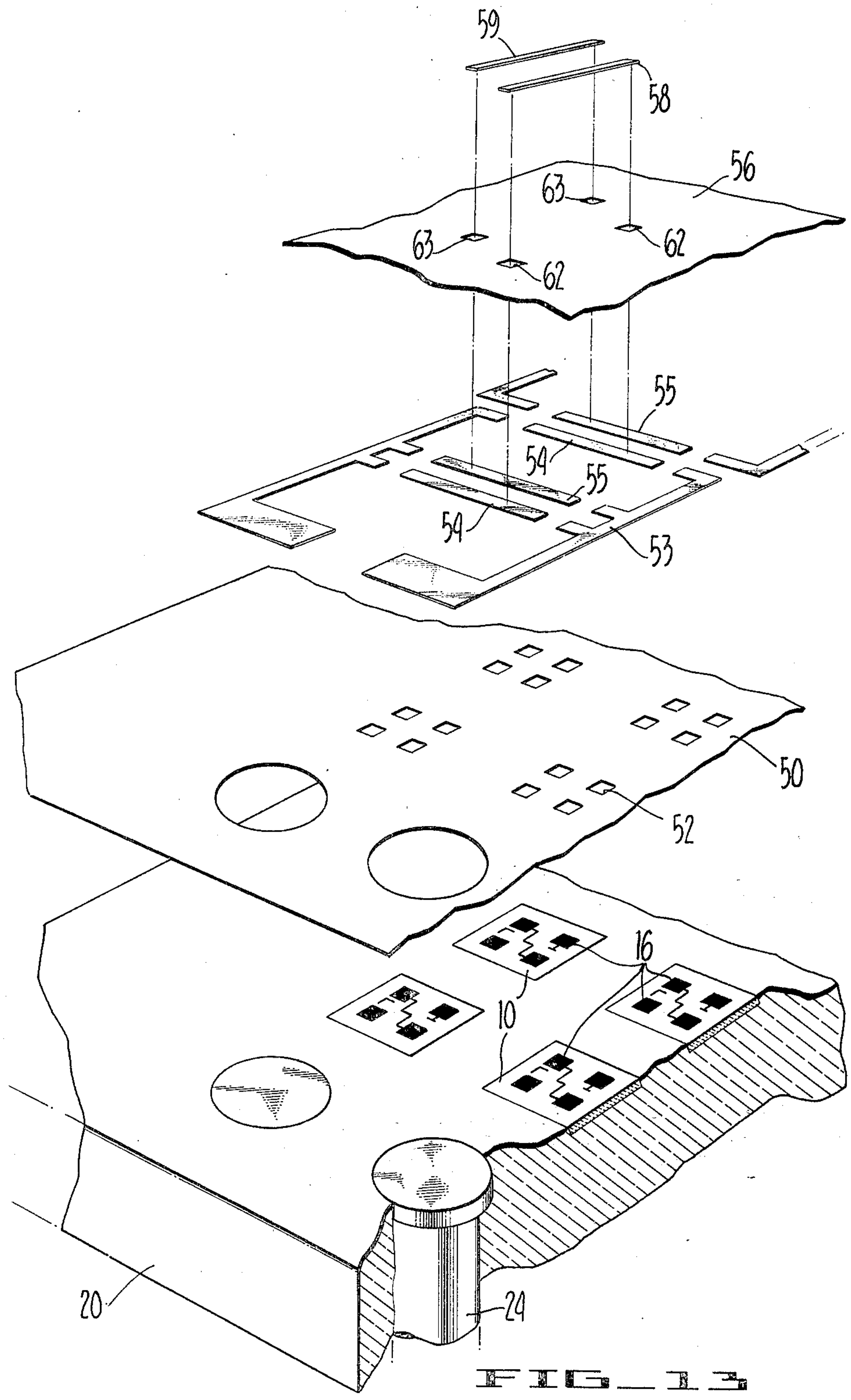
FIG. 13 is an enlarged, exploded, schematic, pictorial view for showing the manner in which insulating layers and patterns of conductors are laid on the encapsulation.

The insulated conductors, indicated in FIG. 3, for connecting the chips into a system may be laid on as successive, patterned layers of insulators and conductors as indicated schematically in the exploded view of FIG. 13. Thus, the layers may be applied to the block, as in FIG. 3, by the so-called "thin film" techniques in which, for example, insulating layers of silicon dioxide and conductors of aluminum are both applied by sputtering in vacuum. Both of these sputtered materials are limited to selected areas by known photoresist techniques.

For example, FIG. 13 shows part of the encapsulating block 20 and four chips 10 with some details omitted and some dimensions exaggerated for facilitating the explanation. A layer of silicon dioxide insulation 50 may be sputtered over the whole surface. This first layer 50 of insulation covers the exposed conductors of the chips and also covers any silicon that has been exposed, as for example, at the edge as a result of breaking the chip from the wafer, as previously described.

Then a photoresist may be applied and photographically developed to leave exposed the areas over the interconnecting pads 16. Then an etchant may remove the silicon dioxide from those areas for leaving the openings 52 over the pads 16. Then the resist may be removed and a layer of aluminum sputtered over the whole surface and similarly covered with a patterned coat of photoresist, and etched to leave some of the circuit conductors such as conductors 53, 54 and 55. A second layer of silicon dioxide insulation 56 and a second layer of aluminum circuit conductors 58 and 59 may be applied similarly to provide cross-overs. Thus, conductor 58 crosses over one of the conductors 55 to connect the two conductors 54 through holes 62 in insulating layer 56 and conductor 59 similarly crosses over one of the conductors 54 to connect the two conductors 55 through holes 63.

Alternatively, the conductor pattern may be applied to the block 20 in FIG. 13 by the so-called "thick film" technology, by which, for example, insulating areas of glass, and conducting patterns of cermets (mixtures of ceramics and metals), may be applied like paint or ink through screen stencils, and fixed by firing. These materials should preferably be thixotropic, that is, flow easily while being worked and then quickly gel. The thick film processes, because they apply thicker layers of materials, can tolerate somewhat greater unevenness of the surface than can the thin film techniques.

Successive conducting layers of metal, and insulating layers of silicon dioxide, may be applied to the epoxy blocks by the same thin film techniques. Alternatively, layers may be applied to the epoxy blocks by thick film techniques using insulating and conducting epoxy inks or paints.

I claim:

1. In an electronic device, the combination comprising:

a block of cast encapsulating material having a surface, said material having a predetermined coefficient of thermal expansion;

a plurality of microelectronic units, each unit including a substrate having a first surface and a second surface, said substrate having a coefficient of thermal expansion closely matched to said predetermined coefficient of thermal expansion;

each of said microelectronic units being embedded in said encapsulating material with said first surfaces of said substrates exposed and forming a substantially smooth planar surface with said surface of said material;

each of said units having interconnection conductors disposed on said exposed first surface;

a patterned layer of conductors overlying said planar surface providing circuit interconnections between said units;

a plurality of heat conductive members each having a first end and a second end, said members being embedded in said encapsulating material with said first end of at least some members in contact with said second surface of individual associated substrates providing a path of heat conduction away from the contacted substrate; and said first end of said heat conductive members being formed of a material having a thermal coefficient of expansion closely matched to said predetermined coefficient of expansion, each substrate and associated heat conductive member being integrally connected by a eutectic bond.

2. The combination of claim 1 wherein said encapsulating material is a ceramic.

3. The combination of claim 1 wherein said encapsulating material is an epoxy resin.

4. The combination of claim 1 wherein there is included metal terminals for external connections cast into said block, said terminals having surfaces flush with said planar surface, said overlying conductors connecting said microelectronic units to said terminals.

5. The device of claim 1 further comprising a layer of insulating material interposed between said planar surface and said layer of conductors, said conductors contacting said microelectronic units via selectively positioned openings in said layer of insulating material.

6. The electronic device of claim 5 comprising:

a second layer of insulating material overlying said layer of conductors;

a second patterned layer of conductors formed on the exposed surface of said second layer of insulating material for providing further interconnections between said microelectronic units, said second layer of conductors contacting said microelectronic units via openings in said layers of insulating material.

7. In an electronic device according to claim 1 wherein said first end of said heat conductive members includes a layer of gold, said layer of gold being in eutectic bond with the material of the associated substrate.

8. In an electronic device according to claim 1 wherein the second end of said heat conductive member extends outwardly of said encapsulating material in an exposed condition.

(References on following page)

References Cited

UNITED STATES PATENTS

| | | | |
|---|---|---|---|
| 3,290,753 | 12/1966 | Chang. | |
| 3,312,871 | 4/1967 | Seki et al. | |
| 3,407,479 | 10/1968 | Fordemwalt et al. | |
| 2,629,802 | 2/1953 | Pantchechnikoff. | |
| 3,029,495 | 4/1962 | Doctor | 29—627 |
| 3,262,022 | 7/1966 | Caracciolo. | |
| 3,370,204 | 2/1968 | Cave. | |

OTHER REFERENCES

Davidson: "Designing Potted Circuits," Pub. Electronic Design, March 1955, pp. 38, 39.

DARRELL L. CLAY, Primary Examiner

U.S. Cl. X.R.

29—588, 624; 249—53; 264—273; 317—234, 101; 174—52, 68.5